Patented Sept. 26, 1944

2,359,038

UNITED STATES PATENT OFFICE 2,359,038

INTERPOLYMERIZATION PRODUCTS OF DIENE SYNTHESIS PRODUCTS AND COMPOUNDS HAVING AN ω-METHYLENE GROUP AND PROCESS OF THEIR PRODUCTION

Heinrich Hopff and Wilhelm Rapp, Ludwigshafen-on-the-Rhine, Germany, assignors, by mesne assignments, to General Aniline & Film Corporation, New York, N. Y., a corporation of Delaware No Drawing. Application June 16, 1939, Serial No. 279,488. In Germany July 12, 1938

10 Claims. (Cl. 260—78)

The present invention relates to polymerization products and a process of producing same.

It is already known that dienes may be added on to substances having a double or triple carbon linkage activated by substituents with the formation of cyclic unsaturated compounds. This reaction is generally known as the "diene synthesis." For example from butadiene and maleic anhydride there is formed tetrahydrophthalic anhydride corresponding to the following scheme:

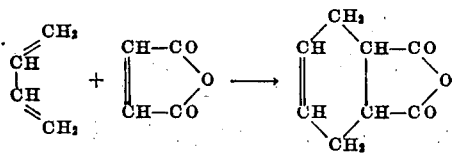

The addition products thus obtained cannot be polymerized by the usual polymerization methods.

We have now found that the diene synthesis products (the said addition products of dienes and compounds having double or triple carbon linkages activated by substituents) can be polymerized together with organic compounds containing an ω-methylene group. Addition compounds of the said kind are for example those of butadiene and its substitution products, such as isoprene, dimethyl-butadiene and beta-chlorbutadiene, and also cyclopentadiene and -hexadiene, with an unsaturated organic compound containing the atomic grouping

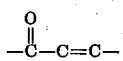

such as maleic anhydride, maleic acid esters, maleic acid imides, vinyl compounds having a carbonyl group adjacent to the vinyl group, such as acrolein, vinyl methyl ketone, and also crotonaldehyde, cinnamic aldehyde, cinnamic acid ester, acrylic acid or methacrylic acid and their derivatives, and vinyl esters, and other compounds not having such atomic grouping, such as vinyl chloride, vinyl ether, acetylene dicarboxylic acid esters, and mono- and di-vinyl-acetylenes.

As polymerizable compounds containing an ω-methylene group which are suitable for interpolymerization with the said addition products, the following compounds which contain the general grouping —CX:CH₂, wherein X stands for hydrogen or an alkyl radical and the CH₂ group stands in the ω-position, may be mentioned: styrene, acrylic and methacrylic compounds, in particular their esters, vinyl esters, vinyl chloride, vinyl ethers, N-vinylcarbazole, butadiene and chlorbutadiene.

The interpolymerization products of the said addition compounds with the polymerizable compounds may take place by any of the known methods of polymerization, as for example by heating, if desired in the presence of polymerization accelerators, such as benzoyl peroxide, acetyl peroxide, hydrogen peroxide or by treating with acid-reacting inorganic halides, as for example boron fluoride. Frequently it is preferable to carry out the polymerization in aqueous emulsion with an addition of dispersing agents, as for example alkylated naphthalene sulphonic acids, sulphuric acid esters of higher fatty alcohols, addition products of several molecules of ethylene oxide to long-chain aliphatic compounds containing a hydroxyl or amino group, or taurides of higher fatty acids or sulphonated fatty acid amides. In many cases it is preferable to stabilize the polymerization products by aftertreatment with basic substances, such as dilute caustic alkali or soda solutions.

The interpolymerization products obtained are from soft rubber like masses to hard masses depending on the initial materials used. The harder polymerization products may be drawn out into foils by the methods usual in the Celluloid industry or may be converted on extrusion presses into tubes, rods or other shaped articles.

The soft interpolymerization products may be worked similarly to rubber.

The following examples will further illustrate how this invention may be carried out in practice, but the invention is not restricted to these examples. The parts are by weight.

*Example 1*

From 2 to 6 parts of a mixture of hydrogen peroxide and potassium persulphate are added to an emulsion of 200 parts of styrene and 50 parts of tetrahydrophthalic acid diethyl ester in 750 parts of water containing from 10 to 12 parts of sodium oleate dissolved therein, the whole being stirred for 24 hours at from 45° to 50° C. at a hydrogen iron concentration corresponding to pH=3.5. The dispersion of interpolymerization product thus obtained is freed from monomeric constituents by treatment with steam. By adding common salt solution, the interpolymerization product which has been formed in almost a quantitative yield is precipitated. It is washed free from electrolytes, treated with methanol at from 40° to 45° C. and dried in vacuo. It is a white powder and contains about 18.5 per cent of tetrahydrophthalic acid ethyl ester polymerized therein.

In the same way an interpolymerization product is obtained in almost a quantitative yield from 200 parts of styrene and 50 parts of methylcyclohexene carboxylic acid ethyl ester. It is obtained as a pale powder by coagulating the polymerization product dispersion.

Example 2

An emulsion of 200 parts of acrylic acid methyl ester and 50 parts of tetrahydrophthalic acid dimethyl ester in 750 parts of water containing from 10 to 12 parts of alpha-hydroxyoctodecane sulphonic acid sodium salt dissolved therein is polymerized as described in Example 1 and the polymerization product dispersion worked up in a corresponding manner. A good yield of a pale, tough, rubber-like polymerization product is obtained.

A pale rubber-like mass is obtained in the same way from 200 parts of acrylic acid methyl ester and 50 parts of methyl cyclohexene carboxylic acid ethyl ester.

Example 3

An emulsion of 100 parts of vinyl chloride and 25 parts of tetrahydrophthalic acid diethyl ester in 400 parts of water containing 6 parts of alpha-hydroxyoctodecane sulphonic acid sodium salt dissolved therein is polymerized, after the addition of from 0.6 to 1 part of potassium persulphate and hydrogen peroxide, at a pH of 3.5 in a pressure-tight vessel for 24 hours at 50° C. while mixing well. The dispersion of polymerization product thus obtained has aluminum sulphate added thereto. The polymerization product thus precipitated is treated at from 60° to 80° C. with about 0.5 per cent of sodium hydroxide solution, centrifuged, washed until neutral with water, then washed with methanol and dried. The dried material contains 50.4 per cent of chlorine, corresponding to 88 per cent of vinyl chloride. The resulting interpolymerization product is a pale granular powder which may be pressed hot into colorless shaped articles.

In the same way, from 250 parts of tetrahydrophthalic acid ethyl ester and 250 parts of vinyl chloride, an interpolymerization product is obtained having a chlorine content of 40.1 per cent, corresponding to 70.5 per cent of vinyl chloride.

Example 4

An emulsion of 200 parts of methacrylic acid ethyl ester and 50 parts of tetrahydrophthalic acid diethyl ester in 750 parts of water containing from 10 to 12 parts of alpha-hydroxy-octodecane sulphonic acid sodium salt dissolved therein is polymerized as described in Example 1. The resulting interpolymerization product is a pale granular powder which may be pressed hot into colorless shaped articles.

A pale granular interpolymerization product is also obtained in the same way from 200 parts of methacrylic acid ethyl ester and 50 parts of methylcyclohexene carboxylic acid ethyl ester.

Example 5

A mixture of 80 parts of styrene and 20 parts of tetrahydrophthalic acid dimethyl ester and 0.5 part of benzoyl peroxide is slowly heated to from 150° to 160° C. Within 2 hours, it has polymerized to a glass-clear solid mass.

A solid glass-clear interpolymerization product is obtained in the same way from 80 parts of styrene and 20 parts of methylcyclohexene carboxylic acid ethyl ester.

Example 6

80 parts of acrylic acid ethyl ester are mixed with 20 parts of tetrahydrophthalic acid diisohexyl ester and polymerized, after the addition of 0.5 part of benzoyl peroxide, during 2 hours at from 120° to 140° C. A soft, viscous and colorless interpolymerization product is obtained.

In the same way a soft, viscous colorless interpolymerization product is obtained from 80 parts of acrylic acid ethyl ester and 20 parts of methylcyclohexene carboxylic acid ethyl ester.

Example 7

112 parts of β-chlorbutadiene and 38 parts of tetrahydrophthalic acid diethyl ester are emulsified in 150 parts of a 4 per cent aqueous solution of the condensation product of 1 molecular proportion of β.β'-dichlordiethyl ether and 2 molecular proportions of a mixture of amines prepared from the nitriles of fatty acids obtained by oxidizing paraffin wax. The emulsion obtained is added with 2 parts of 30 per cent hydrogen peroxide and 0.1 part of potassium persulphate and heated at 40° C. for 24 hours while stirring. The dispersion of the interpolymerization product thus formed is added with methanol, whereby the interpolymerization product is coagulated in the form of flocks. These flocks are washed with water, dried and rolled. A solid sheet is thus obtained. The interpolymerization product can be vulcanized in the usual manner.

What we claim is:

1. Interpolymerization products of vinyl chloride and a tetrahydrophthalic acid ester.
2. Interpolymerization products of styrene and a tetrahydrophthalic acid ester.
3. Interpolymerization products of chlorbutadiene and a tetrahydrophthalic acid ester.
4. A process of producing interpolymerization products which comprises heating a compound having a group of the general formula

wherein X is selected from the class consisting of hydrogen and alkyl and the CH₂ group stands in the ω-position, said compound being selected from the group consisting of styrene, acrylic acid esters, methacrylic acid esters, vinyl chloride, N-vinyl carbazole, butadiene and chlorbutadiene, with a cyclic unsaturated addition product of a diene selected from the class consisting of butadiene, isoprene, dimethyl butadiene, β-chlorbutadiene, cyclopentadiene, and cyclohexadiene, and an unsaturated organic compound containing the atomic grouping

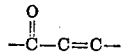

and selected from the class consisting of maleic anhydride, maleic acid esters, acrolein, vinylmethyl ketone, crotonaldehyde, cinnamic aldehyde, acrylic acid, methacrylic acid, and methacrylic acid ethyl ester.

5. The process as defined in claim 2 wherein said components are heated to a temperature of 40 to 160° C.
6. The process as defined in claim 2 wherein said components are heated in the presence of a peroxide acting as a polymerization accelerator.
7. The process as defined in claim 2 wherein the components are heated in the presence of boron fluoride as a polymerization accelerator.

8. A process of producing interpolymerization products which comprises heating a mixture of chlorbutadiene and a tetrahydrophthalic acid ester.

9. The process of producing interpolymerization products which comprises heating a mixture of vinyl chloride and a tetrahydrophthalic acid ester.

10. Interpolymerization products of a compound having the general grouping —CX=CH$_2$ wherein X is selected from the group consisting of hydrogen and alkyl and the CH$_2$ group stands in the $\omega$-position, said compound being selected from the class consisting of styrene, acrylic acid esters, methacrylic acid esters, vinyl chloride, N-vinyl carbazole, butadiene and chlorbutadiene and a cyclic unsaturated addition compound of a diene selected from the class consisting of butadiene, isoprene, dimethylbutadiene, $\beta$-chlorbutadiene, cyclopentadiene, and cyclohexadiene, with an unsaturated organic compound containing the atomic grouping

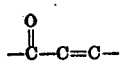

and selected from the class consisting of maleic anhydride, maleic acid esters, acrolein, vinylmethyl ketone, crotonaldehyde, cinnamic aldehyde, acrylic acid, methacrylic acid, and methacrylic acid esters.

HEINRICH HOPFF.
WILHELM RAPP.

Certificate of Correction

Patent No. 2,359,038.  September 26, 1944.

HEINRICH HOPFF ET AL.

It is hereby certified that errors appear in the printed specification of the above numbered patent requiring correction as follows: Page 2, second column, lines 68, 71, and 75, for the claim reference numeral "2" read *4*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.*